Dec. 19, 1922.

J. LETSON.
ROAD MAP HOLDER AND INDICATOR.
FILED NOV. 10, 1921.

1,439,247

Patented Dec. 19, 1922.

1,439,247

UNITED STATES PATENT OFFICE.

JAY LETSON, OF CYLINDER, IOWA.

ROAD-MAP HOLDER AND INDICATOR.

Application filed November 10, 1921. Serial No. 514,379.

*To all whom it may concern:*

Be it known that I, JAY LETSON, a citizen of the United States, and a resident of Cylinder, in the county of Palo Alto and State of Iowa, have invented a certain new and useful Road-Map Holder and Indicator, of which the following is a specification.

The object of my invention is to provide a road map holder and indicator of simple, durable and comparatively inexpensive construction.

More particularly, my invention relates to a device adapted to be secured to the windshield of an automobile for containing a road map in position where it will be directly in front of the driver and yet not interfere with his vision, so that by manipulating the device a map containing the roads may be brought in proper view in front of the operator of the car, so that from examining the map, the driver may know just where he is bound to and the general direction in which he is going.

Still another object of my invention is to provide a casing adapted to receive a road map or the like, the casing being provided with a cover member having a transparent member therein, so that a portion of the map may be displayed through the cover member and an indicator device capable of longitudinal movement and at the same time capable of vertical movement, so that the indicator device may be shifted to any desired position and point out clearly a certain part of the map.

Still another object is to provide a holder device for containing surplus rolls of maps, so that they may be always close at hand and conveniently stored.

Still another object is to provide a record portion, whereby notations of facts relating to a trip may be marked thereon and used for reference, if desired.

Still another object is to provide means for illuminating the map when necessary, the parts being so arranged that the entire cover member extending over the central map may be swung, together with the illuminating means to position where the map may be easily removed and a new one inserted.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a perspective view of a windshield of an automobile with my improved road map holder and indicator secured thereto.

Figure 2 is a central, sectional view taken on the line 2—2 of Figure 1.

Figure 3 is a sectional view taken on the line 3—3 of Figure 2.

Figure 4 is a detail, sectional view showing the adjustable means, whereby the holder may be secured to windshield frames of various sizes.

Figure 5 is an enlarged, front elevation of a portion of the map holder and indicator device; and Figure 6 shows one form of securing the end of the map to the rollers.

In the accompanying drawings, I have used the reference numeral 10 to indicate generally the body of an automobile, which is provided with a windshield frame 11 and the windshield members 12.

My invention is designed to be secured to the windshield frame 11 near the lower portion thereof, so as not to obstruct the view of the driver of the automobile.

My improved road map holder includes a casing 13, having its front side open. Secured to the back of the casing 13 is a strap member 14. The strap member 14 is secured to clamping devices 15. The clamping devices 15 are designed to engage the windshield frame 11 for securely holding the map holder in position. A bolt 16 is extended through the clamping devices 15, whereby the clamping devices may be moved to frictionally engage the windshield frame 11.

One end of the strap member 14 is provided with a slot 17, through which is extended and slidably mounted therein a pair of bolts 18. The bolts 18 are secured to a short bracket 19. One portion of the bracket 19 is secured to one of the clamping devices 15 by means of a bolt 20.

From the construction of the parts just described, it will be seen that by loosening the bolts 18, the entire clamping device and bracket 19 may be shifted longitudinally for making it possible to secure the map holder to the windshield frames, where they are spaced at various distances apart.

The casing 13 has a cover member 21 hinged thereto. In the upper side of the casing 13, I provide a number of loops 22. The cover member 21 is provided with similar loops 23, which are designed to be received between the loops 22, so that a pintle 24 may be extended through the loops 22 and 23 for hingedly connecting the cover member 21 to the casing 13.

Formed integral with the cover member 21 and extending forwardly from the loops 23 is a hood or shade 25. The shade member 25 has secured to it resilient lamp clips 26, in which is received the lamp bulb 27. The cover member 21 is provided with an opening 28.

From the construction of the parts just described, it will be seen that when the cover member is swung to open position, the shade member 25 will also swing with it. Fixed to the lower edge of the cover member 21 is a guide 29, and fixed to the upper end of the cover member 21 is a guide 30.

The guides 29 and 30 form a retaining means for holding the glass 31 in position over the opening 28, as clearly illustrated in Figure 2 of the drawings.

Received in the guide members 29 and 30 is a vertical cross-piece 32, as clearly illustrated in Figures 2 and 5 of the drawings. The cross-piece 32 is capable of longitudinal sliding movement within the guide members 29 and 30.

I provide in the casing 13 a double wall partition 33. Journalled in one of the walls of the partition member 33 and in one of the ends of the casing 13 are a pair of rollers 34. The outer ends of the rollers 34 are provided with a contracted portion and extend out beyond the outer surface of the end wall of the casing.

A finger engaging member 35 is secured to the outer end of the rollers. Received on the contracted portion between one of the ends of the rollers 34 and the wall 13 is a coil spring 36, which yieldingly tends to force the opposite end of the roller 34 in engagement with one of the wall members of the partition 33.

A map 37 has its ends secured to the rollers 34 by means of spring clips 38, or may be fastened in by inserting the ends of the map in a slot formed in the rolls.

From the construction of the parts just described, it will be seen that by manipulation of either of the rollers 34, it will cause the map to be wound off of one of the rollers and onto the other roller or vice versa. The rollers 34 are spaced apart so that a portion of the map will be displayed and can be seen through the transparent member 31.

It will be seen that the lamp bulb 27 furnishes plenty of light in front of the transparent member 31, so that the map may be easily seen by the driver of the automobile.

Slidably mounted on the cross-piece 32 is a yoke member 39 to which is pivoted an indicating finger 40. The yoke member 39 frictionally engages the cross-piece 32, so that when slid to any of its positions, it will remain in that position. The indicating finger is so secured to the yoke 39 that it may be shifted, and will remain in any position to which it is moved, due to the frictional engagement of the yoke 39.

For example, if the driver of the vehicle is on an east and west road, traveling east, the indicating finger 40 would be in the position shown in Figure 5 of the drawings; if traveling west, the finger would be in the position shown in dotted lines in Figure 5.

As the driver travels over the road and is advancing towards the next turn, the cross-piece 32 may be shifted within the guide members 29 and 30, so that the indicating finger 40 will always point to the next turn, and also tend to point out the general direction in which the driver is contemplating on going.

If the driver is traveling north and south, the road travelled over as shown by the map may be brought to display position by rotating the rollers 34 in either direction, as desired.

From the construction of the parts just described, it will be seen that I have provided an indicating device that may be easily moved to various positions, so that the driver of the vehicle will by a glance at the map at the point where the indicator is, know just about where he is.

It will be seen that it is necessary for the driver to move the indicator device either longitudinally or the yoke member vertically, as he travels over the road and changes directions.

If the indicator device is manipulated properly, as the driver passes over the road, the general direction to be traveled can be easily followed.

In order to hold surplus maps, I provide a holder device 41, which is channel-shaped in cross section and has one end hingedly connected to one end of the casing 13, as at 42. The opposite end of the holder device 40 is designed to rest against the partition member 33, as at 43.

It will be seen that the cover member 21 may be swung upon its hinge for removing the maps from the rolls 34. After the map has been removed from the rolls 34, the holder device 41 may be swung out for removing any of the map rolls 37 and for using them, as desired.

The holder device 41 being spaced between the rolls 34 tends to form a flat surface, against which a portion of the map 37 may rest, so that the portion of the map, which is designed to be displayed will ordinarily lie perfectly flat.

Journalled in the free end of the casing 13 and in the partition 33 are a pair of short rollers similar to the rollers 34, upon which is mounted a strip of paper 44. The cover member 21 is provided with an opening 45, whereby a portion of the paper may be brought to position where it may be marked upon. A channel-shaped member 46 is hinged to the end of the casing, as at 47. The channel-shaped member 46 is similar to the construction of the channel-shaped holder device 41. The channel-shaped member 46 permits a portion of the paper 44 between the two rolls to rest thereagainst, so that the driver of the vehicle may make any notations on the paper he desires, always having the flat surface of the channel-shaped member 46 to write against.

The ends of the rolls project out beyond one end of the casing and are provided with a finger engaging member 35, so that the paper 44 may be rolled off of one roll and on to the other roll or vice versa by manipulation of the rolls.

It will be seen that I have provided a very efficient road map holder and indicator device, wherein the map will be located in a position where it may be easily glanced at, and will not become torn or otherwise destroyed as is the case with the ordinary leaf or book form of maps.

It will also be seen that I have provided a very efficient means of storing surplus maps and have so arranged the parts that a new map may be easily inserted and an old one removed.

Some changes may be made in the construction and combination of the various parts of my device, without departing from the essential features and purposes of my invention, and it is my intention to cover by my claims, any modified forms of structure or use of mechanical equivalents, which may be reasonably included within their scope.

I claim as my invention:

1. A road map holder and indicator including a casing designed to be secured to a windshield of an automobile, a cover member hinged to said casing and provided with a transparent portion, a pair of rollers in said casing having a map thereon, whereby a portion of the map may be displayed through said transparent portion, and a channel shaped holder device mounted in said casing for holding an extra map.

2. A road map holder and indicator including a casing designed to be secured to a windshield of an automobile, a cover member hinged to said casing and provided with a transparent portion, a pair of rollers in said casing having a map thereon, whereby a portion of the map may be displayed through said transparent portion, and a channel shaped holder device mounted in said casing for holding an extra map, said holder device being positioned between said pair of rollers whereby the map passing from one roller to the other will ride over said holder device as and for the purposes stated.

3. A road map holder and indicator including a casing designed to be secured to a windshield of an automobile, a cover member hinged to said casing and provided with a transparent portion, a pair of rollers in said casing having a map thereon, whereby a portion of the map may be displayed through said transparent portion, and a channel shaped holder device hingedly mounted in said casing for holding an extra map.

JAY LETSON.